(12) United States Patent
Li

(10) Patent No.: US 9,487,369 B2
(45) Date of Patent: Nov. 8, 2016

(54) SWING-TYPE SENSOR ASSEMBLY

(71) Applicant: SHENZHEN CHINA STAR OPTOELECTRONICS TECHNOLOGY CO., LTD., Shenzhen, Guangdong (CN)

(72) Inventor: Jia Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 275 days.

(21) Appl. No.: 14/241,423

(22) PCT Filed: Jan. 21, 2014

(86) PCT No.: PCT/CN2014/071029
§ 371 (c)(1),
(2) Date: Feb. 26, 2014

(87) PCT Pub. No.: WO2015/081629
PCT Pub. Date: Jun. 11, 2015

(65) Prior Publication Data
US 2015/0153219 A1  Jun. 4, 2015

(30) Foreign Application Priority Data
Dec. 6, 2013 (CN) .......................... 2013 1 0656638

(51) Int. Cl.
*G01H 11/00* (2006.01)
*B65H 7/02* (2006.01)
*G01H 1/00* (2006.01)

(52) U.S. Cl.
CPC ........... *B65H 7/02* (2013.01); *B65H 2406/122* (2013.01); *B65H 2511/51* (2013.01); *B65H 2513/40* (2013.01); *B65H 2553/612* (2013.01); *G01H 1/003* (2013.01)

(58) Field of Classification Search
CPC .......... B65H 7/02; G01H 1/003; G02F 1/00; G01D 11/00; G01D 11/14; G01D 11/16
USPC ............................................. 73/660, 620–626
See application file for complete search history.

(56) References Cited

U.S. PATENT DOCUMENTS

| 3,777,727 A * | 12/1973 | Kirchner ................ F02M 69/20 123/179.16 |
| 2011/0210506 A1* | 9/2011 | Yamazaki ................ B65H 7/02 271/265.04 |

FOREIGN PATENT DOCUMENTS

| CN | 201567086 U | 9/2010 |
| CN | 202853638 * | 4/2013 ............ G01D 11/00 |

(Continued)

OTHER PUBLICATIONS

International Search Report dated Aug. 13, 2014, issued to the corresponding International Application No. PCT/CN2014/071029.

*Primary Examiner* — Hezron E Williams
*Assistant Examiner* — Tarun Sinha
(74) *Attorney, Agent, or Firm* — Stein IP, LLC

(57) ABSTRACT

The present disclosure discloses a swing-type sensor assembly, comprising a support and a sensor vibrator. The support is provided with a pin shaft, and the sensor vibrator is connected to the pin shaft and capable of swinging about the pin shaft. The support is further connected to an air pipe, which is capable of blowing air towards the sensor vibrator. The air pipe is provided with a control valve, an inlet of which is connected, via a pipe, to a supply for clean and dry compressed air. The swing-type sensor assembly saves the sensor vibrator from easy adhesion, thus ensuring a restoring force thereof.

20 Claims, 2 Drawing Sheets

(56) References Cited

FOREIGN PATENT DOCUMENTS

| CN | 202853638 U | 4/2013 |
| CN | 202939103 U | 5/2013 |
| CN | 103246097 A | 8/2013 |
| KR | 10-2011-0017523 A | 2/2011 |
| KR | 10-2011-0062517 A | 6/2011 |
| TW | 338232 | 8/1998 |

* cited by examiner

SWING-TYPE SENSOR ASSEMBLY

FIELD OF THE INVENTION

The present disclosure relates to manufacturing of liquid crystal display panels, in particular to a swing-type sensor assembly.

BACKGROUND OF THE INVENTION

During the manufacturing process of a liquid crystal panel, a glass substrate used for manufacturing the liquid crystal panel would be transferred to pass one to a plurality of liquid reagent chambers, where a strong acid or strong alkali solution is filled, in a wet process. The information of the glass substrate is transferred to the next processing station via a swing-type sensor while the glass substrate passes the chambers in the wet process. That is, a vibrator of the swing-type sensor inside the chambers will be pressed and swung by the glass substrate passing the swing-type sensor, and thus deflected by an angle. The vibrator is restored after being separated from the glass substrate, so as to transmit a signal to the next processing station. Therefore, the next processing station can be ready for receiving the glass substrate.

However, since the swing-type sensor operates in a liquid reagent environment, air drying of the liquid reagent tends to cause the sensor vibrator lacking adhesion and/or restoration force if the sensor vibrator is out of use for a long time. As a result, the vibrator cannot be swung or restored after the glass substrate passes the swing-type sensor, and thus a corresponding signal cannot be transmitted to a receiver in the next processing station. Without receiving the signal, the receiver in the next processing station cannot receive the glass substrate, rendering the glass substrate to be immersed in a strong acid or strong alkali environment for a long time. In this case, the glass substrate has to be discarded, and consequently the product yield will be reduced. Furthermore, the whole equipment needs to be shut off for maintenance once the signal cannot be transmitted normally due to malfunction of the swing-type sensor, thus reducing the operation rate of the equipment.

SUMMARY OF THE INVENTION

To solve the above technical problem, the present disclosure is to provide a swing-type sensor assembly, which prevents a sensor vibrator of the swing-type sensor assembly from being easily adhered and thus ensures the restoration force thereof.

The technical solution adopted by the present disclosure is a swing-type sensor assembly including a support and a sensor vibrator, wherein a pin shaft is arranged on the support, and the sensor vibrator is connected to the pin shaft and capable of swinging about the pin shaft, and wherein the support is further connected to an air pipe, which is capable of blowing air towards the sensor vibrator.

Compared with the prior art, the swing-type sensor assembly in the present disclosure has the following advantage. Air can be blown towards the sensor vibrator through the air pipe. Therefore, even in the case that vibrator adhesion caused by air drying of the liquid reagent or insufficient restoration force occurs after the sensor vibrator is out of use for a long time, the air blown out through the air pipe can still power the sensor vibrator, so that the sensor vibrator will be out of adhesion state and acquires a sufficient restoration force, whereby restoration of the vibrator can be ensured. Thus, the state of the glass substrate can be reflected sensitively while the glass substrate passes the chambers, thereby ensuring normal signal transmission, reducing downtime and maintenance, and improving product yield and equipment operation rate.

In one embodiment, a control valve is arranged on the air pipe, which can control opening and closing of the air pipe, so as to control the time when the air pipe is opened to blow air as well as the duration of air blowing.

In one preferred embodiment, the control valve is an electromagnetic control valve. Opening and closing of the air pipe are controlled through the electromagnetic control valve. The electromagnetic control valve is more convenient for remote control and remote operation than a manual control valve, which facilitates realization of automatic control.

In a preferred embodiment, the air pipe is a fluorine plastic pipe. The fluorine plastic pipe is resistant to strong acid and strong alkali, and accordingly, is seldom corroded in a strong acid or strong alkali environment. Further preferably, the fluorine plastic pipe is a tetrafluoroethylene (perfluoroalkoxy resin, or PFA) pipe. The PFA pipe can be used in strong acid and alkali environments, and does not tend to move when being fixed on the support.

In one embodiment, the air pipe has an inner diameter in the range from 4 to 10 mm. The air pipe having an inner diameter of 5 mm is preferred in this embodiment. The air pipe is known as a thin pipe in the prior art, and the gas passing through this air pipe is small in volume, imparting no effect upon the pressure inside the chambers.

In one preferred embodiment, the gas that is fed into the air pipe is clean and dry compressed air. The clean and dry compressed air refers to the air which is compressed by a compressor, then dehumidified, and then with dusts and hydrocarbons therein being removed by a filter or by adsorption of active carbon. The air is then supplied to dust-free rooms. The fed-in clean and dry compressed air is small in amount, clean, free from pollution, and unlikely to affect the glass substrate.

In a further preferred embodiment, an inlet of the control valve is connected, via a pipe, to a supply for the clean and dry compressed air. This ensures good supply of the clean and dry compressed air.

In one embodiment, the sensor vibrator is electrically connected to a controller, which is provided with a button for controlling the activation and deactivation of the electromagnetic valve. With the control valve being controlled through the button on the controller, even when the sensor is out of use for a long time, the sensor vibrator can still be blown under direct control of the button, thus ensuring the sensitivity of the swing-type sensor.

In one embodiment, the air pipe has an opening 10 to 60 mm away from the sensor vibrator. Within such a range of distance, the sensor vibrator can be blown no matter whether a larger or smaller amount of air is fed into the air pipe, thus ensuring the sensitivity of the swing-type sensor. Moreover, collision of the sensor vibrator with the air pipe is avoided during the swing movement thereof.

In a preferred embodiment, the opening of the air pipe is 30 mm away from the sensor vibrator, which proves to be a distance that can bring about the best effect according to tests. Air blowing of the air pipe can relieve adhesion of the sensor vibrator.

DETAILED DESCRIPTION OF THE EMBODIMENTS

The present disclosure will be further illustrated below in conjunction with the accompanying drawings and specific embodiments.

Figure 1:
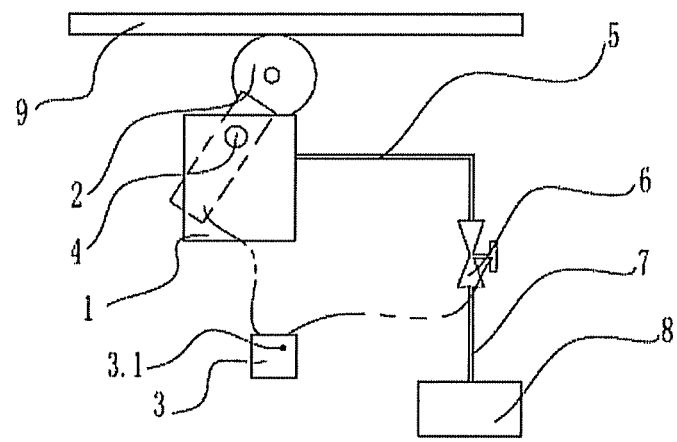
FIG. 1 shows a specific embodiment of a swing-type sensor assembly according to the present disclosure, which is in a state of being normally swung when the glass substrate passes over.
Figure 3:
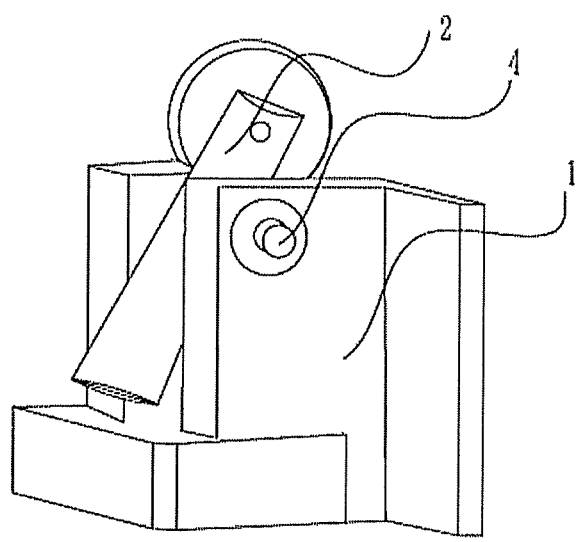
FIG. 3 shows a specific structure for the connection between a support and a sensor vibrator in the swing-type sensor assembly in FIG. 1.

FIG. 1 shows a specific embodiment of a swing-type sensor assembly according to the present disclosure. In this embodiment, the swing-type sensor assembly includes a support 1, a sensor vibrator 2, and a controller 3. The sensor vibrator 2 is electrically connected to the controller 3. A pin shaft 4 is arranged on the support 1. The sensor vibrator 2 is connected to the pin shaft 4 and is capable of swinging in a reciprocating manner about the pin shaft 4 (as shown in FIG. 3). The support 1 is further connected to an air pipe 5, which is capable of blowing air towards the sensor vibrator 2.

Typically, the air pipe 5 adopts a corrosion-resistant hose having an inner diameter in a range from 4 to 10 mm, and has an outlet end, i.e. an air blowing end, fixedly mounted to the support 1. In this embodiment, the air pipe 5 is made from PFA (perfluoroalkoxy resin), which is not only resistant to the corrosion of strong acid and alkali, but also hardly movable after being mounted, thereby ensuring that the air blowing end constantly faces the sensor vibrator 2. In this manner, air can satisfactorily flow to the sensor vibrator 2. Preferably, the air pipe 5 has an inner diameter of 5 mm.

An inlet end of the air pipe 5 is connected to an electromagnetic valve 6, an inlet of which is connected, via a pipe 7, to a supply 8 for clean and dry compressed air. When the electromagnetic valve 6 is activated, the supply 8 will blow the clean and dry compressed air to the sensor vibrator 2 via the electromagnetic valve 6 and the air pipe 5.

In this embodiment, the controller 3 is preferably a touch controller, and a button 3.1 for controlling activation and deactivation of the electromagnetic valve 6 is arranged on the touch screen of the controller 3. When air is required, the electromagnetic valve 6 is activated through the button 3.1 to blow air. After the air blowing is completed, the electromagnetic valve 6 is deactivated through the button 3.1. Thus the electromagnetic valve 6 is not required to be operated at the mounting position thereof, thereby achieving remote control, which is of better convenience.

During mounting of the air pipe 5, it is typically required based upon different inner diameters of the air pipes 5 that, an opening of the air pipe 5, i.e. an air blowing end, is 10 to 60 mm away from the sensor vibrator 2, so that clean and dry compressed air can be guaranteed to release from the air pipe 5 and flow to the sensor vibrator 2.

In the present embodiment, tests have shown that the sensor vibrator 2 can be restored fast under a larger or smaller amount of blown air when the opening of the air pipe 5 having an inner diameter of 5 mm is 30 mm away from the sensor vibrator 2. That is, the distance of 30 mm can ensure that the sensor vibrator 2, which is subject to adhesion and/or has an insufficient restoration force, can be restored fast during air blowing, so that the sensor vibrator 2 can transmit a signal to the next processing station normally when the glass substrate 9 passes over. Meanwhile, this distance can also ensure that the sensor vibrator 2 does not collide with the air pipe 5 during the reciprocating swing movement.

In the embodiment as shown in FIG. 1, the sensor vibrator 2 can operate normally when air is blown from the air pipe 5, can be swung normally during the passing of the glass substrate 9, and can be normally restored to send the signal to the next processing station after the glass substrate 9 is separated from the sensor vibrator 2.

Figure 2:
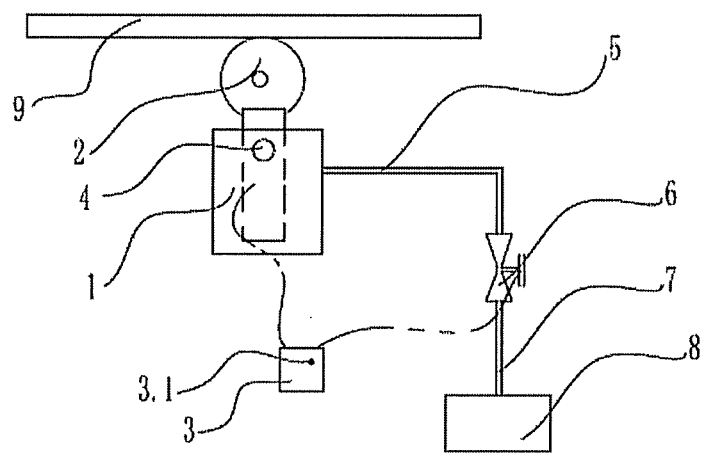
FIG. 2 schematically shows the swing-type sensor assembly in FIG. 1, which cannot be swung and restored normally owing to adhesion when the glass substrate passes over.

In the embodiment as shown in FIG. 2, the sensor vibrator 2 has an insufficient restoration force due to adhesion resulting from air drying of the liquid reagent or other factors, or due to too large resistance from the pin shaft 4. Thus the sensor vibrator 2 cannot be swung normally during the passing of the glass substrate 9, and therefore cannot send the signal after the glass substrate 9 is separated from the sensor vibrator 2, rendering the corrosion of the glass substrate 9 by being immersed in the chambers filled with strong acid or strong alkali for a long time.

Although the present disclosure has been described in conjunction with the preferred embodiments, it can be understood that various modifications or substitutes can be made to the present disclosure without departing from the scope of the present disclosure. Particularly, all features in all the embodiments may be combined together as long as structural conflicts do not exist, and the combined features to be formed are still within the scope of the present disclosure. The present disclosure is not limited to the specific embodiments disclosed herein, but encompasses all the technical solutions falling into the scope of the claims.

The invention claimed is:

1. A swing-type sensor, assembly, comprising a support and a sensor vibrator,
   wherein the support is provided with a pin shaft, and the sensor vibrator is connected to the pin shaft and capable of swinging about the pin shaft; and
   the support is further connected to an air pipe, which is capable of blowing air towards the sensor vibrator.

2. The swing-type sensor assembly according to claim 1, wherein a control valve is arranged on the air pipe.

3. The swing-type sensor assembly according to claim 2, wherein the control valve is an electromagnetic control valve.

4. The swing-type sensor assembly according to claim 1, wherein the air pipe is a fluorine plastic pipe.

5. The swing-type sensor assembly according to claim 4, wherein the air pipe is a perfluoroalkoxy resin pipe.

6. The swing-type sensor assembly according to claim 1, wherein the air pipe has an inner diameter in the range from 4 to 10 mm.

7. The swing-type sensor assembly according to claim 2, wherein the air pipe has an inner diameter in the range from 4 to 10 mm.

8. The swing-type sensor assembly according to claim 3, wherein the air pipe has an inner diameter in the range from 4 to 10 mm.

9. The swing-type sensor assembly according to claim 4, wherein the air pipe has an inner diameter in the range from 4 to 10 mm.

10. The swing-type sensor assembly according to claim 5, wherein the air pipe has an inner diameter in the range from 4 to 10 mm.

11. The swing-type sensor assembly according to claim 6, wherein the gas that is fed into the air pipe is clean and dry compressed air.

12. The swing-type sensor assembly according to claim 7, wherein the gas that is fed into the air pipe is clean and dry compressed air.

13. The swing-type sensor assembly according to claim 8, wherein the gas that is fed into the air pipe is clean and dry compressed air.

14. The swing-type sensor assembly according to claim 9, wherein the gas that is fed into the air pipe is clean and dry compressed air.

15. The swing-type sensor assembly according to claim 10, wherein the gas that is fed into the air pipe is clean and dry compressed air.

16. The swing-type sensor assembly according to claim 11, wherein an inlet of the control valve is connected, via a pipe, to a supply for the clean and dry compressed air.

17. The swing-type sensor assembly according to claim 3, wherein the sensor vibrator is electrically connected to a controller, which is provided with a button for controlling activation and deactivation of the electromagnetic valve.

18. The swing-type sensor assembly according to claim 11, wherein the sensor vibrator is electrically connected to a controller, which is provided with a button for controlling activation and deactivation of the electromagnetic valve.

19. The swing-type sensor assembly according to claim 1, wherein the air pipe has an opening which is 10 to 60 mm away from the sensor vibrator.

20. The swing-type sensor assembly according to claim 19, wherein the opening of the air pipe is 30 mm away from the sensor vibrator.

* * * * *